(12) United States Patent
Kim

(10) Patent No.: US 8,556,242 B2
(45) Date of Patent: Oct. 15, 2013

(54) ROLL-ROD FOR VEHICLE

(75) Inventor: Jin-Woo Kim, Soowon-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 110 days.

(21) Appl. No.: 13/232,732

(22) Filed: Sep. 14, 2011

(65) Prior Publication Data

US 2012/0133091 A1     May 31, 2012

(30) Foreign Application Priority Data

Nov. 30, 2010    (KR) .......................... 10-2010-120966

(51) Int. Cl.
*B60G 11/22*     (2006.01)

(52) U.S. Cl.
USPC .................. 267/293; 267/140.12; 267/140.13; 267/141.5

(58) Field of Classification Search
USPC .................... 267/140.12, 140.13, 141.5, 293; 180/300
See application file for complete search history.

(56) References Cited

U.S. PATENT DOCUMENTS

| | | | | |
|---|---|---|---|---|
| 3,552,785 A * | 1/1971 | Elder et al. | ..................... | 403/197 |
| 3,756,551 A * | 9/1973 | Bishop | ........................ | 267/141.1 |
| 4,392,640 A * | 7/1983 | Kakimoto | .................. | 267/141.2 |
| 4,575,114 A * | 3/1986 | Camp | ..................... | 280/124.152 |
| 4,641,855 A * | 2/1987 | Izumi | ............................ | 267/258 |
| 4,874,651 A * | 10/1989 | Takai | .............................. | 428/81 |
| 5,597,173 A * | 1/1997 | Schindler et al. | ...... | 280/124.147 |
| 7,044,457 B2 * | 5/2006 | Bucksbee | ................... | 267/141.3 |
| 7,261,306 B2 * | 8/2007 | Trotter | ................... | 280/124.106 |
| 7,306,208 B2 * | 12/2007 | Hwang | ..................... | 267/140.13 |
| 2003/0155809 A1 * | 8/2003 | Schlitzkus et al. | ......... | 303/119.3 |
| 2004/0075204 A1 * | 4/2004 | Heidemann et al. | .......... | 267/294 |
| 2006/0244188 A1 * | 11/2006 | Johnson et al. | ............... | 267/293 |

FOREIGN PATENT DOCUMENTS

| | | |
|---|---|---|
| JP | 11-129768 A | 5/1999 |
| JP | 2000-289467 A | 10/2000 |
| JP | 2002-211249 A | 7/2002 |
| KR | 10-0736980 B1 | 7/2007 |

* cited by examiner

*Primary Examiner* — Bradley King
*Assistant Examiner* — Mahbubur Rashid
(74) *Attorney, Agent, or Firm* — Morgan, Lewis & Bockius LLP

(57) ABSTRACT

A roll-rod for a vehicle includes an inner pipe protruding from an end surface of a roll-rod body which penetrates an insulator engaged to a bracket and an end plate may be coupled to a rear side of the inner pipe, a fastening bolt being mounted to fasten the end plate to the inner pipe, wherein the insulator has a supporter inserted into a through-hole formed in the bracket and having a pipe shape, and a first front stopper extended from the supporter and protruding to the front of the bracket, and a first rear stopper extended from the supporter and protruding to the rear of the bracket, wherein the first front stopper, the first rear stopper and the supporter may be integrally molded to be fixedly coupled to the bracket.

10 Claims, 5 Drawing Sheets

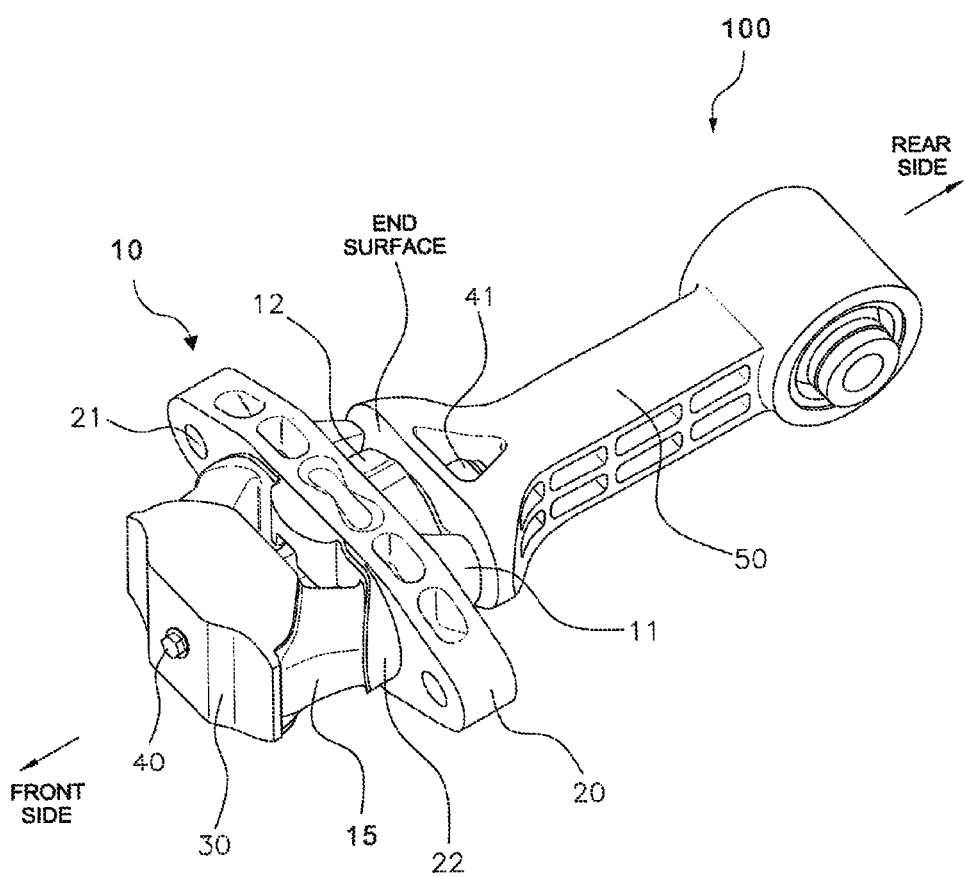

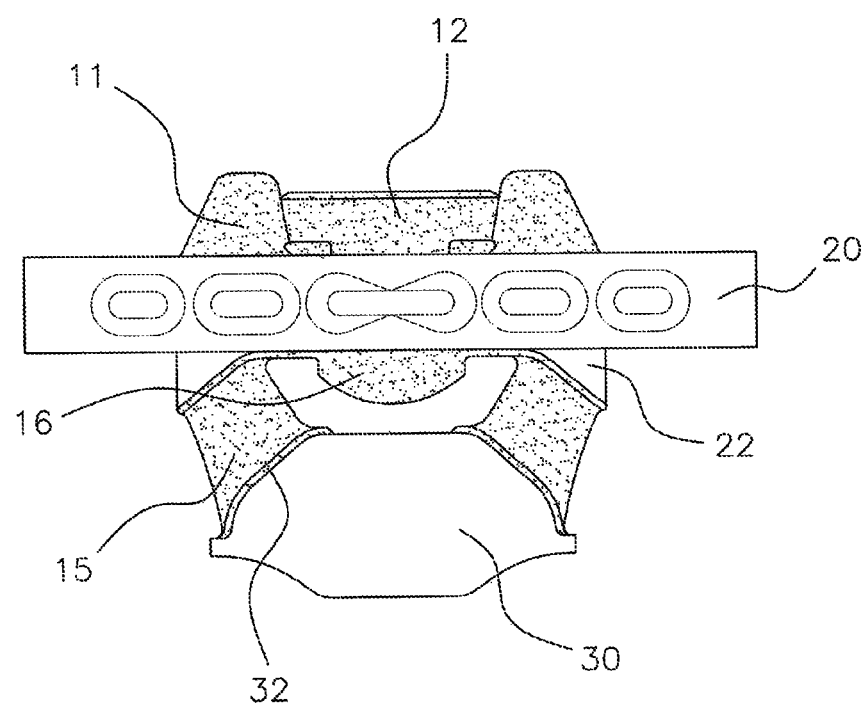

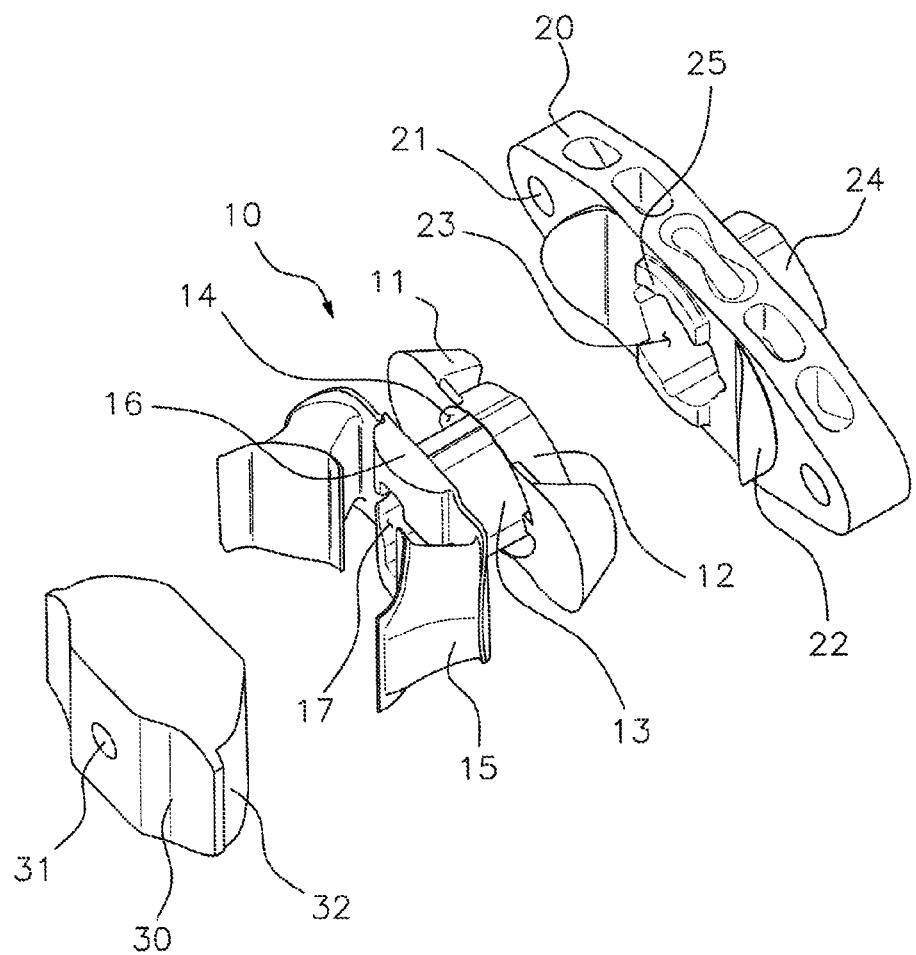

ROLL-ROD FOR VEHICLE

CROSS-REFERENCE TO RELATED APPLICATIONS

The present application claims priority to Korean Patent Application No. 10-2010-120966, filed on Nov. 30, 2010, the entire contents of which is incorporated herein for all purposes by this reference.

BACKGROUND OF THE INVENTION

1. Field of the Invention

The present invention relates to a roll-rod for a vehicle, and more particularly, to a roll-rod for a vehicle in which an insulator is molded integrally with a bracket to damp large-displacement vibration and small-displacement vibration more efficiently.

2. Description of Related Art

Automobiles primarily employ monocoque bodies which are light in weight and excellent in productivity instead of frame bodies. The monocoque body is a structure in which an additional frame is removed and in the monocoque body, a power train where an engine and a transmission are coupled to each other is mounted directly on an engine room of a vehicle body. Therefore, since the vehicle body itself acts as a frame in the monocoque body, suspension and chassis parts are mounted on the monocoque body, respectively, but vibration of the power train is prevented from being transferred directly to the vehicle body and a subframe is mounted on a lower part of a vehicle in order to disperse an impact when the vehicle collides.

A suspension device and a steering device are mounted on the subframe, which is connected to a lower part of the power train through a roll-rod. That is, as shown in FIG. 1A, an engine mount and a transmission mount are mounted on both sides of the vehicle body to support a load of the power train and the roll-rod mounted on the subframe shares displacement controlling and vibration damping of the power train.

The structure of the known roll-rod is shown in FIG. 1B. Referring to FIG. 1B, the roll-rod includes a roll-rod body, a front insulator, a bracket, a rear insulator, an end plate, and a fastening bolt. The roll-rod body has a bar shape. A bush is coupled to a front portion of the roll-rod body protruding from the subframe and coupled to the power train and an inner pipe protrudes from an end surface of a rear portion of the roll-rod body inserted into the subframe. The front insulator, the bracket, the rear insulator, the end plate, and the fastening bolt are sequentially mounted on the inner pipe. The front insulator and the rear insulator are made of an elastic material and are partitioned by a partition wall formed in the bracket. In addition, the fastening bolt fastens the end plate and penetrates the inner pipe, and the end of the fastening bolt protrudes to be fixed by a nut. Therefore, the front insulator and/or rear insulator are/is elastically compressed according to movement and vibration of the roll-rod body where the bracket is fixed to the subframe.

That is, when the vehicle moves forward, the rear insulator is compressed according to the displacement of the power train by inertia to perform a damping function and when the vehicle moves backward or decelerates, the front insulator is compressed to perform the damping function.

Meanwhile, since insulators which are elastic bodies are separated from each other in a known roll-rod, a tensile load is not generated, but only a compression load acts on each of the insulators, and as a result, the known roll-rod is advantageous in durability.

However, in the case in which compression force is applied horizontally, vibration damping rate deteriorates to cause a bush to be twisted or impacted and it is difficult to control damping depending on vibration characteristics. In particular, since insulators are manufactured simply in a bucket shape without a curve, damping efficiency of small-displacement vibration deteriorates. Further, an assembly process is not simple and when the insulator is mounted in a twisted state, an assembly error occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a roll-rod for a vehicle that simplifies a structure by integrally configuring the insulators and improves the damping efficiency depending on the vibration characteristics.

In an aspect of the present invention, the oll-rod for a vehicle may include an inner pipe protruding from an end surface of a roll-rod body that penetrates an insulator engaged to a bracket and an end plate may be coupled to a rear side of the inner pipe, a fastening bolt being mounted to fasten the end plate to the inner pipe, wherein the insulator may include a supporter inserted into a through-hole formed in the bracket and having a pipe shape, and a first front stopper extended from the supporter and protruding to the front of the bracket, and a first rear stopper extended from the supporter and protruding to the rear of the bracket, wherein the first front stopper, the first rear stopper and the supporter may be integrally molded to be fixedly coupled to the bracket.

A plurality of first front stoppers may protrude from the supporter and may be spaced apart from each other so as to be symmetrical to each other with respect to the supporter and a second front stopper protruding with a length shorter than the first front stoppers in the same direction as the first front stoppers may be additionally formed between the first front supporters in front of the supporter.

A front surface of the second front stopper may be mounted to the through-hole formed in the bracket.

A first reinforcing portion protrudes on a front surface of the bracket to support the second front stopper.

A plurality of first rear stoppers may be spaced part from each other and protrude to be symmetrical to each other with respect to the supporter and may be closely contacted with the end plate, and a gap therebetween may be gradually narrowed rearwards to form a V shape.

A second rear stopper protrudes between the first rear stoppers to face the end plate.

A second reinforcing portion protrudes on a rear surface of the bracket to support a rear surface of the first rear stoppers, wherein an rear surface of the second reinforcing portion may be slanted with a predetermined degree from the bracket so as to support an outer surface of the first front stoppers towards a center axis of the roll-rod body.

An insertion hole may be formed in the supporter and the second reinforcing portion so as to receive the inner pipe therein.

An insertion hole may be formed in the supporter so as to receive the inner pipe therein.

The insulator may be manufactured by injection molding of foaming a shape by injecting a molten synthetic resin material into a mold, and particularly, the insulator may be manufactured by insert injection molding of previously inserting a bracket into the mold and integrally injecting the insulator into the bracket, wherein the end plate may be additionally inserted into the mold and the first rear stopper may be molded to be bonded to the end plate.

According to the exemplary embodiments of the present invention, in a roll-rod for a vehicle, since insulators are integrally molded to be coupled to a bracket, a possibility of an assembly error is further suppressed and a cost saving effect is acquired due to reduction in assembly processes and raw material cost.

Moreover, two stoppers are provided at front and rear sides, such that vibration can be damped more efficiently depending on vibration characteristics. That is, a first front stopper and a first rear stopper take charge of small-displacement vibration and movement of a power train and a second front stopper and a second rear stopper share large-displacement vibration and movement of the power train, and as a result, movement and vibration in a wider area can be controlled.

Further, the configuration diversifies tuning factors of the insulators to improve design flexibility according to required performance.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a perspective view of a roll-rod for a vehicle according to an exemplary embodiment of the present invention.

FIG. 3 is a plan view showing a state in which insulators are molded integrally with a bracket and an end plate according to an exemplary embodiment of the present invention.

FIG. 4 is a perspective view showing insulators, and a bracket, and an end plate that are separated from each other.

Figure 1A:
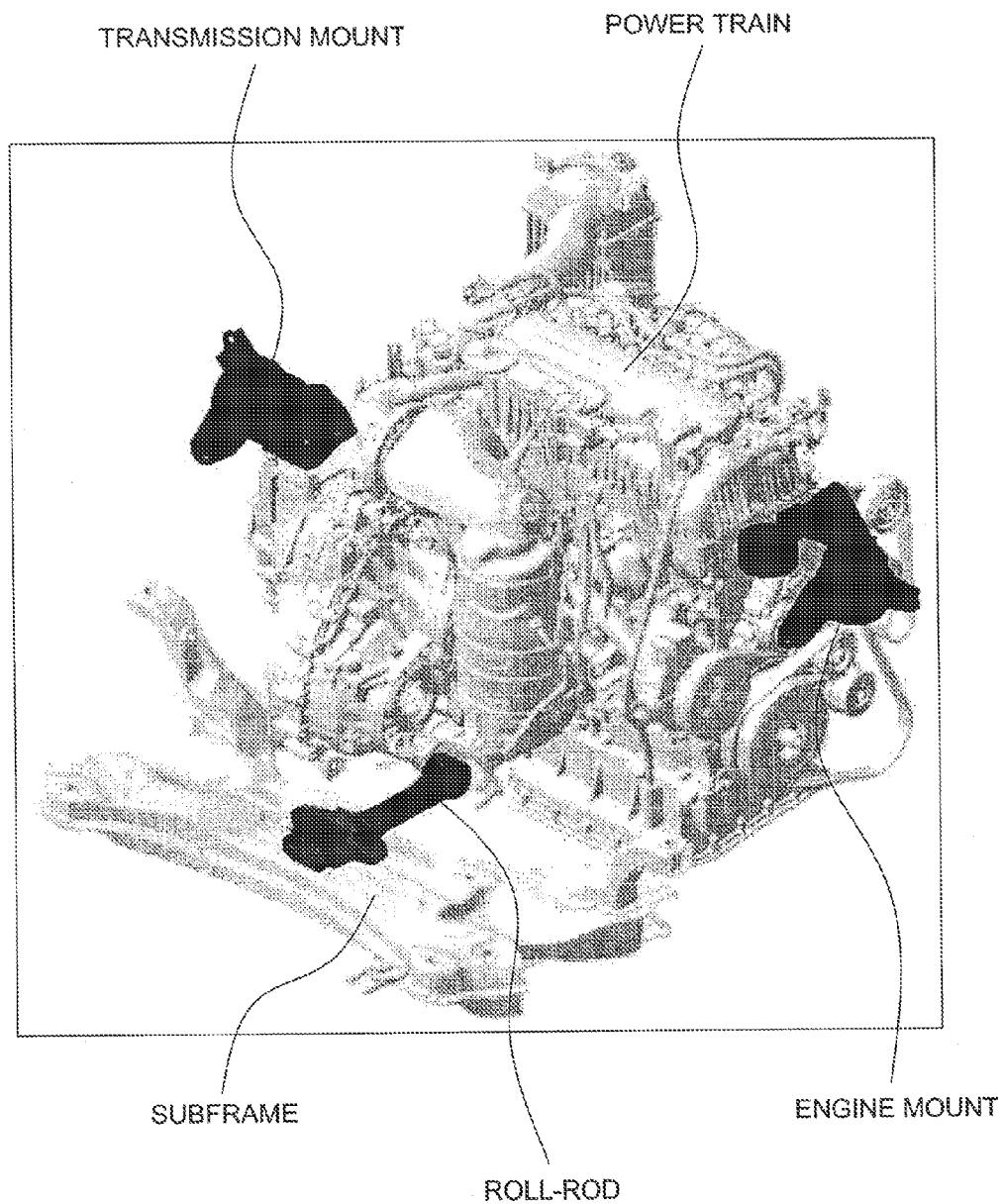
FIG. 1A is an image showing a state in which a roll-rod connecting a power train and a subframe is mounted.
Figure 1B:
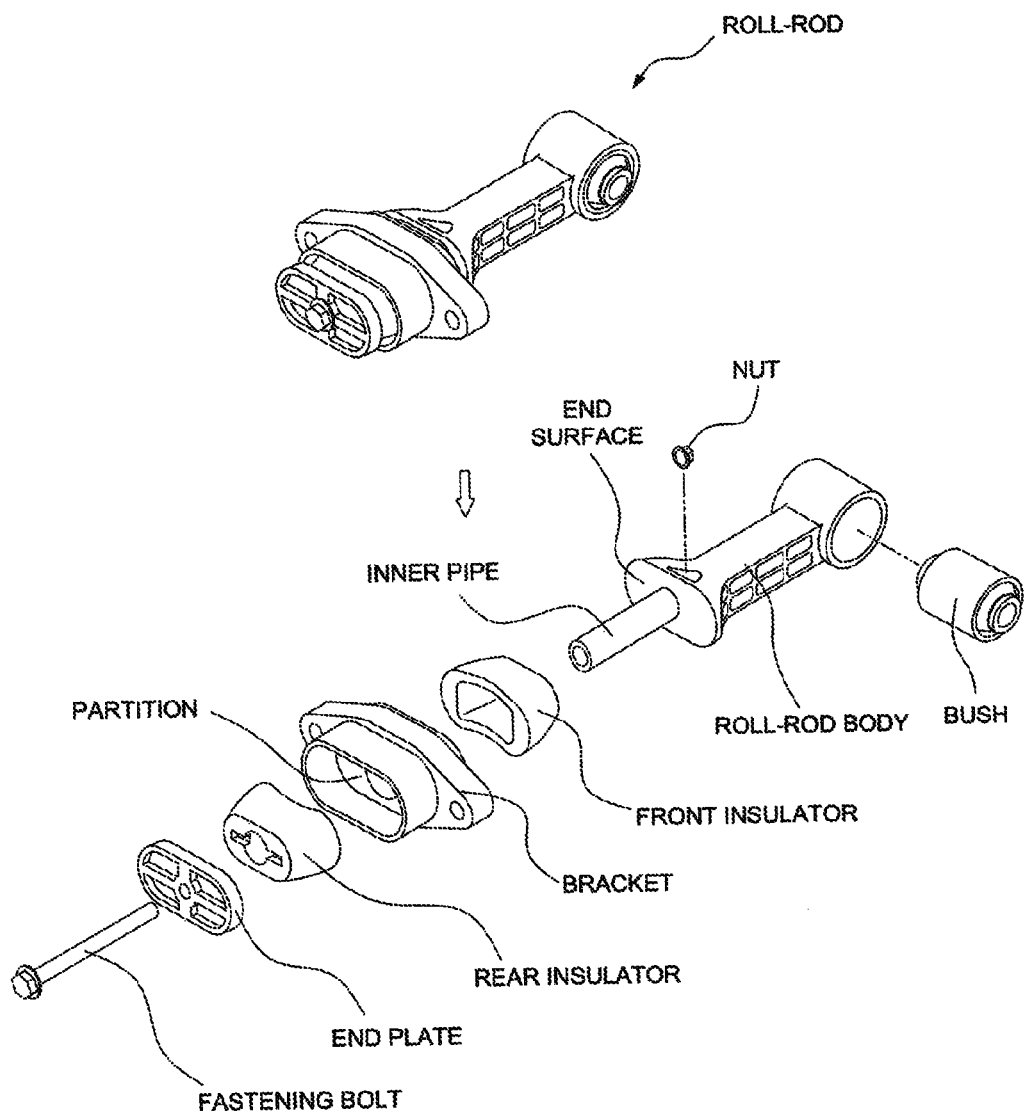
FIG. 1B is a perspective view and an exploded perspective view of a known roll-rod.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a roll-rod for a vehicle according to an exemplary embodiment of the present invention will be described in more detail with reference to the accompanying drawings.

As shown in FIG. 2, like a known roll-rod, in the roll-rod 100 for a vehicle according to the exemplary embodiment of the present invention, an insulator 10 is elastically transformed between an end surface of a roll-rod body 50 and an end plate 30 to support movement of a power train and damp vibration, and as shown in FIG. 3, a bracket 20, and the insulator 10 and the end plate 30 are integrally manufactured.

That is, the insulator 10 as a synthetic resin material is injected into a mold to be foamed in a melted state and thereafter, cooled to be manufactured. In the state which the bracket 20 and the end plate 30 (made of a metallic material) are inserted into predetermined locations of the mold, the insulator 10, and the bracket 20 and the end plate 30 are integrally molded. Such an insert injection molding method is a manufacturing method in which a mold is configured to be opened and closed vertically and horizontally and the shape of an injection object (insulator) is foamed according to the shapes of insertion objects (bracket and end plate) and is generally used to produce a product having heterogeneous materials. Accordingly, since a structure of the mold and an injection method are apparent to those skilled in the art, a detailed description thereof will be omitted.

Hereinafter, the insulator 10, and the bracket 20 and the end plate 30 that are integrally molded will be individually described in more detail.

As shown in FIG. 4, the bracket 20 according to the exemplary embodiment of the present invention has a plate shape in which a through-hole 23 is formed at the center thereof (so that an inner pipe penetrates) and holes 21 are formed at both sides to be bolt-fastened to a subframe and a first reinforcing portion 24, and a second reinforcing portion 22 and a third reinforcing portion 25 protrude in the front and rear thereof, respectively.

In addition, in the insulator 10, a first front stopper 11 and a first rear stopper 15 are integrally molded around a pipe-shaped supporter 13. The supporter 13 is positioned on an inner peripheral surface of the through-hole 23 of the bracket 23 and includes an insertion hole 17 formed along a longitudinal direction so that the inner pipe of the roll-rod body 50 penetrates. In addition, the first front stopper 11 is formed in the front of the supporter 13 (facing the end surface of the roll-rod body) and the two first front stoppers 11 are spaced apart from each other and a second front stopper 12 is additionally formed therebetween. As shown in FIG. 3, the second front stopper 12 protrudes shorter than the first front stopper 11 and a groove 14 is formed at the front end of the supporter 13 (on the circumference) so as to have larger rigidity, and the first reinforcing portion 24 of the bracket 20 is inserted into the groove 14.

Moreover, first rear stoppers 15 are formed at both sides of the rear end of the supporter 13 to be supported on the second reinforcing portion 22. The first rear stoppers 15 are formed to be bonded to both slopes 32 of the end plate 30 and a gap between the ends thereof is gradually narrowed to form a "V" shape. In addition, a second rear stopper 16 protrudes between the first rear stoppers 15. The third reinforcing portion 25 is also partially inserted and supported into the second rear stopper 16 (to improve rigidity like the second front stopper).

As shown in FIG. 2, when the inner pipe reaches the end plate 30 through the insertion hole 17 of the supporter in the front to couple the roll-rod body 50, the fastening bolt 40 penetrates the end plate 30 and the inner pipe through a bolt hole 31 formed in the end plate 30 to be fixed by a nut 41, and as a result, the roll-rod 100 according to the exemplary embodiment of the present invention in which the insulator 10, and the bracket 20 and the end plate 30 are integrally configured is assembled.

In addition, the roll-rod 100 is mounted on the subframe through the holes 21 formed at both sides of the bracket 20 and connected to the power train through the bush coupled to the front end of the roll-rod body 50, such that the insulator 10 is elastically compressed and restored in repetition according to the movement of the power train to thereby control the movement and vibration of the power train.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roll-rod for a vehicle in which an inner pipe protruding from an end surface of a roll-rod body penetrates an insulator engaged to a bracket and an end plate is coupled to a rear side of the inner pipe, a fastening bolt being mounted to fasten the end plate to the inner pipe, wherein the insulator includes:
    a supporter inserted into a through-hole formed in the bracket and having a pipe shape;
    a first front stopper extended from the supporter and protruding to the front of the bracket; and
    a first rear stopper extended from the supporter and protruding to the rear of the bracket,
    wherein the first front stopper, the first rear stopper and the supporter are integrally molded to be fixedly coupled to the bracket;
    wherein a plurality of first front stoppers protrude from the supporter and are spaced apart from each other so as to be symmetrical to each other with respect to the supporter and a second front stopper protruding with a length shorter than the first front stoppers in the same direction as the first front stoppers is additionally formed between the first front supporters in front of the supporter; and
    wherein a front surface of the second front stopper is mounted to the through-hole formed in the bracket.

2. The roll-rod for a vehicle of claim 1, wherein a first reinforcing portion protrudes on a front surface of the bracket to support the second front stopper.

3. The roll-rod for vehicle of claim 1, wherein a plurality of first rear stoppers are spaced part from each other and protrude to be symmetrical to each other with respect to the supporter and are closely contacted with the end plate, and a gap therebetween is gradually narrowed rearwards to form a V shape.

4. The roll-rod for a vehicle of claim 3, wherein a second rear stopper protrudes between the first rear stoppers to face the end plate.

5. The roll-rod for a vehicle of claim 3, wherein a second reinforcing portion protrudes on a rear surface of the bracket to support a rear surface of the first rear stoppers.

6. A roll-rod for a vehicle in which an inner pipe protruding from an end surface of a roll-rod body penetrates an insulator engaged to a bracket and an end plate is coupled to a rear side of the inner pipe, a fastening bolt being mounted to fasten the end plate to the inner pipe, wherein the insulator includes:
    a supporter inserted into a through-hole formed in the bracket and having a pipe shape;
    a first front stopper extended from the supporter and protruding to the front of the bracket; and
    a first rear stopper extended from the supporter and protruding to the rear of the bracket,
    wherein the first front stopper, the first rear stopper and the supporter are integrally molded to be fixedly coupled to the bracket;
    wherein a plurality of first rear stoppers are spaced part from each other and protrude to be symmetrical to each other with respect to the supporter and are closely contacted with the end plate, and a gap therebetween is gradually narrowed rearwards to form a V shape;
    wherein a second reinforcing portion protrudes on a rear surface of the bracket to support a rear surface of the first rear stoppers; and
    wherein an rear surface of the second reinforcing portion is slanted with a predetermined degree from the bracket so as to support an outer surface of the first rear stoppers towards a center axis of the roll-rod body.

7. The roll-rod for a vehicle of claim 5, wherein an insertion hole is formed in the supporter and the second reinforcing portion so as to receive the inner pipe therein.

8. The roll-rod for a vehicle of claim 1, wherein an insertion hole is formed in the supporter so as to receive the inner pipe therein.

9. The roll-rod for a vehicle of claim 1, wherein the insulator is manufactured by injection molding of foaming a shape by injecting a molten synthetic resin material into a mold, and the insulator is manufactured by insert injection molding of previously inserting a bracket into the mold and integrally injecting the insulator into the bracket.

10. The roll-rod for a vehicle of claim 9, wherein the end plate is additionally inserted into the mold and the first rear stopper is molded to be bonded to the end plate.

* * * * *